United States Patent [19]

Panster et al.

[11] Patent Number: 5,552,474
[45] Date of Patent: Sep. 3, 1996

[54] AQUEOUS SOLUTIONS OF ORGANOPOLYSILOXANE-AMMONIUM COMPOUNDS, METHODS OF THEIR MANUFACTURE AND USE

[75] Inventors: Peter Panster, Rodenbach; Stefan Wieland, Offenbach, both of Germany

[73] Assignee: Degussa Aktiengesellschaft, Frankfurt, Germany

[21] Appl. No.: 400,790

[22] Filed: Mar. 3, 1995

[30] Foreign Application Priority Data

Mar. 17, 1994 [DE] Germany .................... 44 09 140.0

[51] Int. Cl.$^6$ ...................................................... C08L 83/00
[52] U.S. Cl. ...................... 524/588; 524/837; 524/858; 524/869; 528/9; 528/38
[58] Field of Search .................... 524/837, 858, 524/588, 869; 528/9, 38

[56] References Cited

U.S. PATENT DOCUMENTS

| | | | |
|---|---|---|---|
| 4,287,094 | 9/1981 | Panster et al. | 252/431 R |
| 4,362,885 | 12/1982 | Panster et al. | 556/446 |
| 4,410,669 | 10/1983 | Panster et al. | 525/474 |
| 4,424,332 | 1/1984 | Panster et al. | 528/30 |
| 4,442,040 | 4/1984 | Panster et al. | 260/429 R |
| 4,445,415 | 6/1984 | Panster et al. | 528/39 |
| 4,507,490 | 3/1985 | Panster et al. | 556/427 |
| 4,552,700 | 11/1985 | Panster et al. | 556/9 |
| 4,578,496 | 3/1986 | Panster et al. | 556/479 |
| 4,584,395 | 4/1986 | Panster et al. | 556/479 |
| 4,595,740 | 6/1986 | Panster et al. | 528/30 |
| 4,645,847 | 2/1987 | Panster et al. | 556/9 |
| 4,645,848 | 2/1987 | Panster et al. | 556/9 |
| 4,645,850 | 2/1987 | Deschler et al. | 556/431 |
| 4,647,644 | 3/1987 | Panster et al. | 528/30 |
| 4,647,679 | 3/1987 | Panster et al. | 556/9 |
| 4,647,682 | 3/1987 | Panster et al. | 556/431 |
| 4,704,428 | 11/1987 | Deschler et al. | 524/535 |
| 4,758,277 | 7/1988 | Spruegel et al. | 106/36 |
| 4,772,457 | 9/1988 | Panster et al. | 423/561 R |
| 4,845,163 | 7/1989 | Panster et al. | 525/475 |
| 4,851,492 | 7/1989 | Panster et al. | 528/9 |
| 4,855,470 | 8/1989 | Panster et al. | 556/421 |
| 4,954,599 | 9/1990 | Panster et al. | 528/38 |
| 4,999,413 | 3/1991 | Panster et al. | 528/30 |
| 5,003,024 | 3/1991 | Panster et al. | 528/30 |
| 5,019,637 | 5/1991 | Panster et al. | 528/25 |
| 5,039,643 | 8/1991 | Hecht et al. | 502/200 |
| 5,049,690 | 9/1991 | Deschler et al. | 556/421 |
| 5,061,773 | 10/1991 | Panster et al. | 528/9 |
| 5,093,451 | 3/1992 | Panster et al. | 528/9 |
| 5,094,831 | 3/1992 | Klockner et al. | 423/342 |
| 5,126,473 | 6/1992 | Klockner et al. | 556/473 |
| 5,130,396 | 7/1992 | Panster et al. | 528/9 |
| 5,132,337 | 7/1992 | Panster et al. | 523/117 |
| 5,187,134 | 2/1993 | Panster et al. | 502/158 |
| 5,219,899 | 6/1993 | Panster et al. | 523/118 |
| 5,237,019 | 8/1993 | Wieland et al. | 525/475 |
| 5,239,033 | 8/1993 | Panster et al. | 528/9 |
| 5,248,706 | 9/1993 | Panster et al. | 523/113 |
| 5,260,470 | 11/1993 | Goebel et al. | 556/466 |
| 5,264,514 | 11/1993 | Panster et al. | 528/9 |
| 5,286,885 | 2/1994 | Goetz et al. | 549/531 |
| 5,340,895 | 8/1994 | Panster et al. | 528/9 |
| 5,352,791 | 10/1994 | Panster et al. | 546/165 |
| 5,354,831 | 10/1994 | Panster et al. | 528/9 |
| 5,380,791 | 1/1995 | Panster et al. | 524/863 |

*Primary Examiner*—Margaret Glass
*Attorney, Agent, or Firm*—Beveridge, DeGrandi, Weilacher & Young

[57] ABSTRACT

Disclosed are aqueous solutions of polymeric organosiloxane-ammonium compounds which possess ion exchange properties and a method for manufacture from solid organopolysiloxanes. The solutions are used in the hydrophobing treatment of inorganic materials and building materials.

21 Claims, No Drawings

AQUEOUS SOLUTIONS OF ORGANOPOLYSILOXANE-AMMONIUM COMPOUNDS, METHODS OF THEIR MANUFACTURE AND USE

INTRODUCTION AND BACKGROUND

The present invention relates to aqueous solutions of polymeric organosiloxane-ammonium compounds which possess ion exchange properties and a method for their manufacture and use.

Polymeric organosiloxane-ammonium compounds of this kind are known in solid form from DE 38 00 564 (U.S. Pat. Nos. 5,130,396 and 5,239,033). In DE 31 20 195 (U.S. Pat. No. 4,410,669), the polymeric ammonium compounds are soluble in hot water at a pH of 7 in the case of 2 Si atoms per quaternized N atom; however, at room temperature the polymers precipitate. The polymeric ammonium compounds of DE 31 20 195 are totally insoluble in hot water in the case of 3 or 4 Si atoms per quaternized N atom. The presence of such polymeric organosiloxane-ammonium compounds in solid form (fine-particle, spherical) limits severely, however, the possible uses of these polymers containing a silica type skeleton.

SUMMARY OF THE INVENTION

An object of the present invention is the production of aqueous solutions of ion exchangers which are suitable for treating inorganic materials or building materials. The present invention provides alkaline aqueous solutions of polymeric silicon-containing ion exchangers which consist of units with the following formula

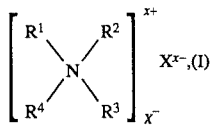

in which $R^1$ and $R^2$ are the same or different and signify a group with the general formula

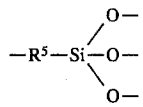

wherein the nitrogen atoms in (I) are connected via the residues $R^5$ with the silicon atoms in (II) and the free valences of O are partially or completely saturated by H or by alkali metal ions and $R^5$ represents an alkylene group with 1 to 10 C atoms, a cycloalkylene group with 5 to 8 C atoms or a unit with the general formula

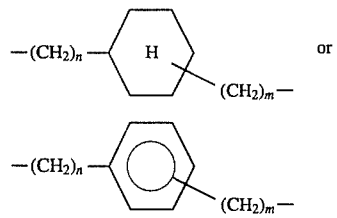

in which n is a number from 1 to 6 and indicates the number of methylene groups in the nitrogen position and m is a number from 0 to 6, wherein the free valences of the oxygen atoms bonded to the silicon atom are, as with silica skeletons, saturated by silicon atoms of further groups of formula (II) and/or with the metal atoms of one or more of the crosslinking bridge members (III)

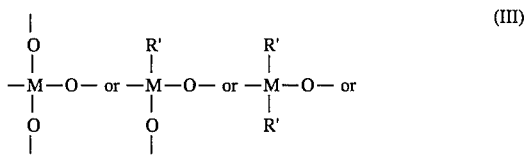

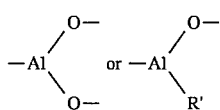

wherein M is a silicon, titanium or zirconium atom and R' is a linear or branched alkyl group with 1 to 5 C atoms, and the ratio of the silicon atoms from the groups of general formula (II) to the metal atoms in the bridge members (III) is 1:0 to 1:10, in which $R^3$ is equal to $R^1$ or $R^2$ or hydrogen, a linear or branched alkyl group of 1 to 20 C atoms, or a cycloalkyl group consisting of 5 to 6 C atoms, and $R^4$ represents hydrogen, a linear or branched alkyl group with 1 to 20 C atoms or a cycloalkyl group consisting of 5 to 8 C atoms, X corresponds to an anion, in particular OH⁻, and x to a number from 1 to 3.

DETAILED DESCRIPTION OF THE INVENTION

According to a more detailed aspect of the invention, preferred compounds which are present in the solution are those in which $R^5$ corresponds to a propylene group.

Particularly suitable are also those in which $R^1$, $R^2$ and $R^3$ are identical and $R^4$ corresponds to a methyl group.

A preferably used educt is

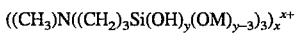

distinguished in solution by the formula

with y=0, 1, 2, or 3, and M is an alkali metal ion.

Critical for the solubility is the number of groups of formula (II) bonded to nitrogen. If only $R^1$ and $R^2$ are of the formula (II) type, a better solubility of the polymer exists, and hence a higher concentration of the soluble organosiloxane-ammonium compounds, than in cases where three substituents on the nitrogen are of the (II) type.

Consequently, the possible concentration of dissolved siloxane also covers a wide range from 0.1 to 70 wt%. Lower concentrations are naturally possible, but because of the low active substance content they are relevant to only a limited extent. Highly viscous fluids are obtained in the upper concentration range which in certain circumstances are still fluid only at elevated temperature (~40°–100° C.), but which set like glass at room temperature. These then solid substances can be dissolved without difficulty in water, optionally with boiling. A preliminary comminution of the solid by crushing or grinding may be advisable.

Particularly favorable is a content of 5–30 wt% of siloxane-ammonium compounds in the aqueous solution, since the content is sufficiently high for commercial application, but the solutions can still be handled easily and applied to surfaces by pouring, spraying or dipping.

For the stability of the aqueous solution against unwanted solids precipitation, a content of alkali hydroxide of at least 1.5 times the mole quantity, of Si atoms present in the organosiloxane-ammonium compound according to formula (I) plus the optionally present molar quantities of Si-, Ti-, Zr- or Al-containing crosslinkers is advantageous. Higher concentrations of alkali hydroxide are naturally also possible, so that the alkali hydroxide content in the solution can lie between 0.01 and 50 wt%. The lowest possible base concentrations are naturally aimed at for the commercial applications. In the solution according to the invention the oxygen atoms in the groups of formula (II) can be partially or completely saturated by alkali metals or hydrogen or partially saturated by silicon, titanium, zirconium, aluminum or other metals which are contained in the organopolysiloxanes, as described in the cited patent specifications, on which the solution is based (U.S. Pat. No. 5,130,396; 5,239,033 and 4,410,669 are incorporated by reference in their entirety). Organo-silicic acids or organo-silicates can therefore exist in solution as monomers or oligomers.

Unlike U.S. Pat. No. 4,410,669, the solutions according to the invention with 2 or 3 Si atoms per quaternized N atom can be formed at room temperature at higher concentrations with ammonium compounds when the pH value is greater than 7; in other words, the solutions are not neutral, they are aqueous alkaline solutions.

In the method for manufacturing the solutions according to the invention, a hydrolysis of the polysiloxane skeleton takes place so that soluble organosilanolate units are obtained from the insoluble, highly crosslinked siloxane matrix.

As is known, the units according to formula (I) can as a function of their concentration in aqueous solution also be present as soluble oligomers, in which at least two molecules are bonded to one another via a siloxane bridge. If the concentration of an aqueous solution of compounds of formula (I) were to be increased beyond the limit of 70 wt% determined as critical, structures of higher molecular weight would however be obtained, which precipitate out of the solution as solids. This process is however reversible by the addition of water, so that for particular applications of these organosilicon compounds in principle a corresponding suspension can also be used.

Oligomers, i.e. condensed derivatives, which are present in equilibrium with the corresponding monomers in solution, as a function of e.g. concentration, alkali content and temperature, can have e.g. the following structure

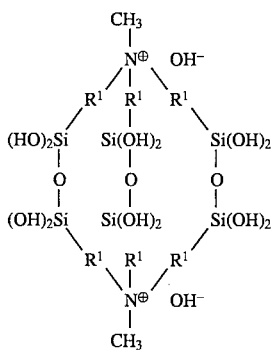

wherein as a function of the alkali content of the solution some or all of the hydrogen atoms or ions of the OH groups in the Si position are replaced by alkali metal atoms or ions.

Depending on the starting compound of formula (I) used, there can be present in the alkaline, aqueous solution of the silicon-containing ion exchangers optionally also monomers or oligomeric silicon, titanium, zirconium or aluminum units, which result from a partial or complete hydrolysis of the siloxane or heterosiloxane skeleton of the bridge members according to formula (III) functioning as crosslinkers. As a function of e.g. concentration, alkali content or temperature, these crosslinkers can be present as monomeric silicate, titanate, zirconate or aluminate units, e.g. with the structure

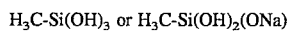

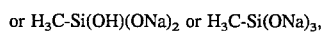

or however also as oligomeric derivatives condensed individually on their own, e.g. $H_3C-Si(ONa)_2-O-Si(ONa)_2^-CH_3$, or as derivatives fused to hydrolyzed monomeric or oligomeric units according to formula (I).

The invention likewise provides a method for manufacturing solutions described above, characterized in that formed or unformed polymeric, crosslinked organosiloxane-ammonium compounds with a silica type skeleton, consisting of units with the general formula

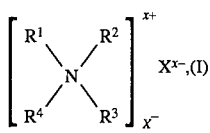

in which $R^1$ or $R^2$ are the same or different and signify a group with the general formula

wherein the nitrogen atoms in (I) are connected via the residues $R^5$ with the silicon atoms in (II) and $R^5$ represents an alkylene group with 1 to 10 C atoms, a cycloalkylene group with 5 to 8 C atoms or a unit with the general formula

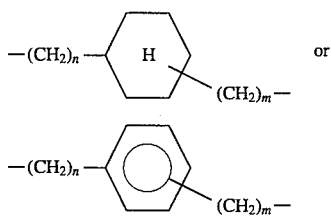

in which n is a number from 1 to 6 and indicates the number of methylene groups in the nitrogen position and m is a number from 0 to 6, wherein the free valences of the oxygen atoms bonded to the silicon atom are, as with silica skeletons, saturated by silicon atoms of further groups of formula (II) and/or with the metal atoms of one or more of the crosslinking bridge members (III)

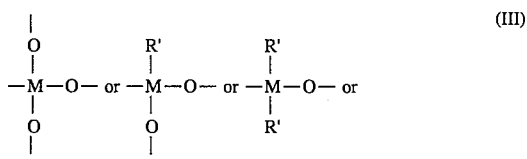

-continued

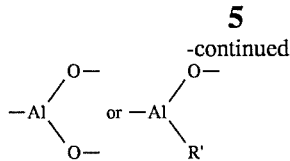

wherein M is a silicon, titanium or zirconium atom, and R' is a linear or branched alkyl group with 1 to 5 C atoms, and the ratio of the silicon atoms from the groups of general formula (II) to the metal atoms in the bridge members (III) is 1:0 to 1:10, and in which $R^3$ is equal to $R^1$ or $R^2$ or hydrogen, a linear or branched alkyl group of 1 to 20 C atoms, a cycloalkyl group consisting of 5 to 6 C atoms or the benzyl group, and $R^4$ represents likewise hydrogen, a linear or branched alkyl group with 1 to 20 C atoms or a cycloalkyl group consisting of 5 to 8 C atoms, X is an anion with the valency of x equal to 1 to 3, preferably from the halide or sulphate group, are converted into the hydroxide optionally by repeated washing, preferably at room temperature, with a 0.01 to 1 molar, preferably 0.1 to 0.5 molar, aqueous alkali hydroxide solution (e.g., KOH, LiOH, NaOH). After this, it is washed neutral and X-anions-free and then treated with an alkali hydroxide (e.g., KOH, LiOH, NaOH) in water at a temperature between 40° and 200° C., preferably 60° and 100° C., optionally under a pressure arising in this system, until the solid polymer used has dissolved.

As a rule it is sufficient to reflux with 0.5–2 times the molar quantity of alkali hydroxide, based on the quantity of Si atoms present in the polymer used plus the molar quantity of Si-, Ti-, Zr- or Al-containing crosslinkers optionally present.

It is possible to intensify the solution effect by the addition of auxiliary substances which prevent renewed fusing of the silanol groups, such as e.g. ethylene glycol. Similarly, bases can also be used in excess in order to accelerate the solution process, which is then subsequently partly neutralized.

Depending on the amount of polysiloxane to be dissolved, only a very short time of a few minutes can be sufficient, but it may also however become necessary to dissolve the polysiloxane in alkaline material over a longer period, optionally with the re-charging of the alkaline material or polysiloxane. If the solution is manufactured in a pressure vessel, higher temperatures up to 200° C. can be used, at pressures which correspond to the sum of the partial pressures of the components present. This can be advantageous for the acceleration of the solution process. As regards the composition of the aqueous polysiloxane-ammonium solution, the form of use of the polysiloxane according to formula (I) is critical. In order to avoid the presence of undesirable anions in the solution, it is advantageous, prior to the actual dissolving, to first of all convert the solid ammonium-polysiloxane compound into the desired form by an ion exchange.

A system which is of extraordinary importance on grounds of commercial availability is the aqueous solution of

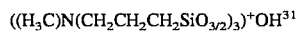

used as a solid compound. It is surprising that with this system stable solutions, not gelling or precipitating solids, are also present, which exhibit in the form used typically a polysiloxane content of 5–30 wt%, referred to the total quantity of the solution, but have only an alkali metal ion content of typically 1–5 wt% based on the total quantity of the solution.

EXAMPLE 1

347 g of the solid polysiloxane with the composition

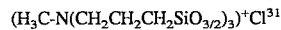

are first of all converted into the hydroxide form by repeated washing with a total of 20 l 0.1 M NaOH and after this are washed neutral and chloride-free. The solid is dissolved with 1.0 l 2 M NaOH at 80° C. in 2 hours. The clear solution obtained is cooled and diluted to 2.0 l, so that a usable solution is obtained which is 1.0 M of NaOH (approx. 3 wt%) and 0.5 M of ammonium polysiloxane (approx. 13 wt%)(wt% based on the total amount of the solution).

EXAMPLE 2

347 g of the polysiloxane as in Example 1 are dissolved directly in 0.5 l 4 M LiOH and 0.25 l water at 95° C. in 1.5 hours, cooled and diluted to 1.0 l. The clear solution obtained is 2.0 M of LiOH (approx. 3.5 wt%) and 1.0 M of ammonium polysiloxane (approx. 23 wt%).

Further variations and modifications of the foregoing will be apparent to those skilled in the art and such variations and modifications are attended to be encompassed by the claims that are appended hereto.

What is claimed:

1. An aqueous alkaline solution of organopolysiloxane-ammonium compounds, said solution comprising dissolved polysiloxane compounds which consist of units with the following formula:

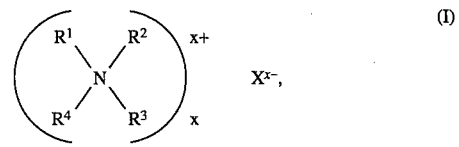

in which $R^1$ and $R^2$ are the same or different and signify a group with the formula

wherein the nitrogen atoms in (I) are connected via the residues $R^5$ with the silicon atoms in (II) and the free valences of O are partially or completely saturated by H or by alkali metal ions and $R^5$ represents an alkylene group with 1 to 10 C atoms, a cycloalkylene group with 5 to 6 C atoms or a unit with the formula

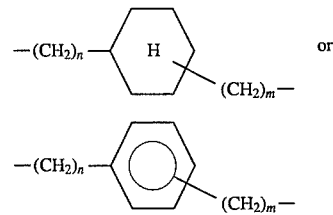

in which n is a number from 1 to 6 and indicates the number of methylene groups and m is a number from 0 to 6, wherein if said free valences of O are only partially saturated with H or by alkali metal ions then the remaining free valences of the oxygen atoms bonded to the silicon atom are saturated by silicon atoms of further groups of formula (II) and/or with the metal atoms of one or more of the crosslinking bridge members (III)

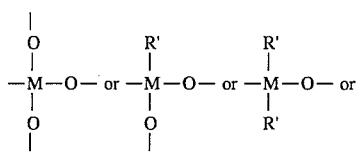

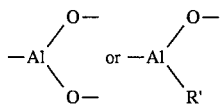

wherein M is a silicon, titanium or zirconium atom and R' is a linear or branched alkyl group with 1 to 5 C atoms and the ratio of the silicon atoms from the groups of general formula (II) to the metal atoms in the bridge members (III) is 1:0 to 1:10, in which $R^3$ is $R^1$ or $R^2$ or hydrogen, a linear or branched alkyl group of 1 to 20 C atoms, or a cycloalkyl group consisting of 5 to 6 C atoms, and $R^4$ represents hydrogen, a linear or branched alkyl group with 1 to 20 C atoms or a cycloalkyl group consisting of 5 to 8 C atoms, x is a number from 1 to 3, and $X^{x-}$ signifies a 1- to 3-valent anion.

2. The aqueous alkaline solution according to claim 1, wherein $X^{x-}$ stands for $OH^-$.

3. The aqueous alkaline solution according to claim 1, wherein $R^5$ is a propylene group.

4. The aqueous alkaline solution according to claim 1, wherein $R^1$, $R^2$ and $R^3$ are identical and $R^4$ is a methyl group.

5. The aqueous alkaline solution according to claim 1, wherein said aqueous alkaline solution contains $((CH_3)N((CH_2)_3Si(OH)_y(OM)_{y-3})_3)_x^{x+}$ where y=0, 1, 2, or 3, x=1, 2 or 3, and M is an alkali metal ion.

6. The aqueous alkaline solution according to claim 1, wherein the content of said dissolved polysiloxane compounds is between 0.1 and 70 wt% of said solution.

7. The aqueous alkaline solution according to claim 6, wherein the content of said dissolved polysiloxane compounds is between 5 to 30 wt% of said solution.

8. The aqueous alkaline solution according to claim 1, wherein $R^3$ is hydrogen, a linear or branched alkyl group of 1 to 20 C atoms, or a cycloalkyl group consisting of 5 to 6 C atoms.

9. The aqueous alkaline solution according to claim 1, wherein only $R^1$ and $R^2$ are formula II.

10. The aqueous alkaline solution according to claim 1, wherein $R^1$, $R^2$ and $R^3$ are formula II.

11. The aqueous alkaline solution according to claim 1, wherein said solution contains a content of alkali hydroxide of at least 1.5 times the mole quantity of Si atoms present in said polysiloxane compounds according to formula (I) plus the optionally present molar quantities of said Si-, Ti-, Zr- or Al-containing crosslinking bridge members.

12. The aqueous alkaline solution according to claim 1, wherein said solution contains a content of alkali hydroxide of between 0.01 and 50 wt% of said solution.

13. The aqueous alkaline solution according to claim 1, wherein said solution consists essentially of dissolved polysiloxane compounds which consist of units with the following formula:

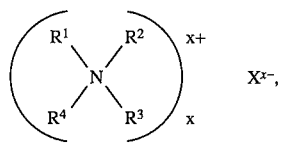

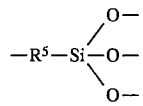

in which $R^1$ and $R^2$ are the same or different and signify a group with the formula

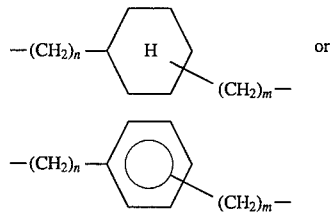

wherein the nitrogen atoms in (I) are connected via the residues $R^5$ with the silicon atoms in (II) and the free valences of O are partially or completely saturated by H or by alkali metal ions and $R^5$ represents an alkylene group with 1 to 10 C atoms, a cycloalkylene group with 5 to 6 C atoms or a unit with the formula

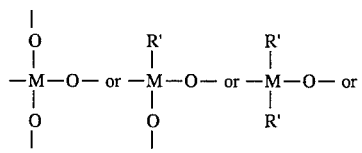

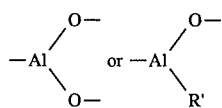

in which n is a number from 1 to 6 and indicates the number of methylene groups and m is a number from 0 to 6, wherein if said free valences of O are only partially saturated with H or by alkali metal ions then the remaining free valences of the oxygen atoms bonded to the silicon atom are saturated by silicon atoms; of further groups of formula (II) and/or with the metal atoms of one or more of the crosslinking bridge members (III)

$$
\begin{array}{c}
| \\
O \quad R' \quad R' \\
| \quad | \quad | \\
-M-O- \text{ or } -M-O- \text{ or } -M-O- \text{ or} \\
| \quad | \quad | \\
O \quad O \quad R' \\
| \quad |
\end{array} \qquad (III)
$$

$$
-Al\begin{array}{c} O- \\ \diagdown \\ O- \end{array} \text{ or } -Al\begin{array}{c} O- \\ \diagdown \\ R' \end{array}
$$

wherein M is a silicon, titanium or zirconium atom and R' is a linear or branched alkyl group with 1 to 5 C atoms and the ratio of the silicon atoms from the groups of general formula (II) to the metal atoms in the bridge members (III) is 1:0 to 1:10, in which $R^3$ is $R^1$ or $R^2$ or hydrogen, a linear or branched alkyl group of 1 to 20 C atoms, or a cycloalkyl group consisting of 5 to 6 C atoms, and $R^4$ represents hydrogen, a linear or branched alkyl group with 1 to 20 C atoms or a cycloalkyl group consisting of 5 to 8 C atoms, x is a number for 1 to 3, and $X^{x-}$ signifies a 1- to 3-valent anion.

14. A method for manufacturing the aqueous alkaline solution according to claim 1, comprising converting into a hydroxide formed or unformed polymeric, crosslinked organosiloxane-ammonium compounds with a silica skeleton, consisting of units with the formula

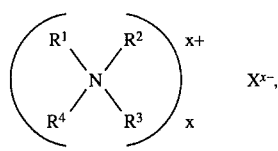

in which R¹ or R² are the same or different and signify a group with the formula

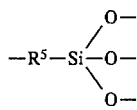

wherein the nitrogen atoms in (I) are connected via the residues R⁵ with the silicon atoms in (II) and R5 represents an alkylene group with 1 to 10 C atoms, a cycloalkylene group with 5 to 8 C atoms or a unit with the formula

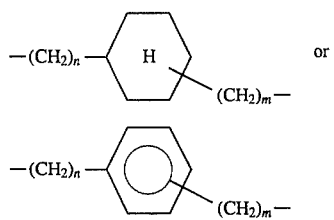

in which n is a number from 1 to 6 and indicates the number of methylene groups and m is a number from 0 to 6, wherein if said free valences of O are only partially saturated with H or by alkali metal ions then the remaining free valences of the oxygen atoms bonded to the silicon atom are saturated by silicon atoms of further groups of formula (II) and/or with the metal atoms of one or more of the crosslinking bridge members (III)

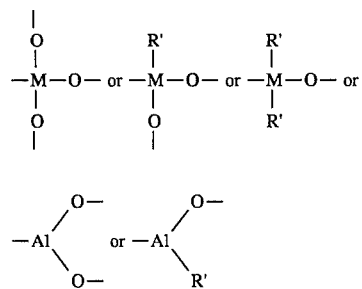

wherein M is a silicon, titanium or zirconium atom and R' is a linear or branched alkyl group with 1 to 5 C atoms and the ratio of the silicon atoms in the groups of formula (II) to the metal atoms in the bridge members (III) is 1:0 to 1:10, and in which R³ is R¹ or R² or hydrogen, a linear or branched alkyl group of 1 to 20 C atoms, or a cycloalkyl group consisting of 5 to 8 C atoms, and R⁴ represents hydrogen, a linear or branched alkyl group with 1 to 20 C atoms or a cycloalkyl group consisting of 5 to 8 C atoms, x is a number from 1 to 3, X is an anion with the valency of x equal to 1 to 3 from the halide or sulphate group, by washing at least once with a 0.01 to 1 molar aqueous alkali hydroxide solution, washing said hydroxide until said hydroxide is neutral and free of X$^{x-}$ anions, and treating with a basic hydroxide in water at a temperature between 40° and 200° C., optionally at a pressure which corresponds to the sum of the partial pressures of the components in said method, until said organosiloxane-ammonium compounds have dissolved.

15. The method according to claim 14, wherein said aqueous alkali hydroxide solution is 0.1 to 0.5 molar.

16. The method according to claim 14, wherein the alkali hydroxide in said aqueous alkali hydroxide solution and the hydroxide in said basic hydroxide in water is selected from the group consisting of LiOH, NaOH and KOH.

17. The method according to claim 14, wherein said temperature is between 60° and 100° C.

18. The method according to claim 14, wherein the hydroxide is used is 0.5 to 2 times the molar quantity of the molar quantities of Si atoms present in the polymer plus the optionally present molar quantities of Si-, Ti-, Zr- or Al-containing crosslinking bridge members.

19. The method according to claim 14, wherein said organo-siloxane-ammonium compound is $((CH_3)N((CH_2)_3SiO_{3/2})_3)^+X^-$.

20. The method according to claim 14, wherein said method consists essentially of converting into a hydroxide formed or unformed polymeric, crosslinked organosiloxane-ammonium compounds with a silica skeleton, consisting of units with the formula

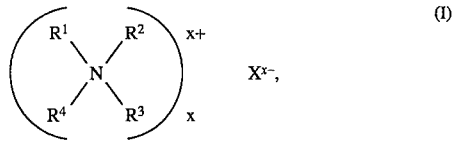

in which R¹ or R² are the same or different and signify a group with the formula

wherein the nitrogen atoms in (I) are connected via the residues R⁵ with the silicon atoms in (II) and R⁵ represents an alkylene group with 1 to 10 C atoms, a cycloalkylene group with 5 to 8 C atoms or a unit with the formula

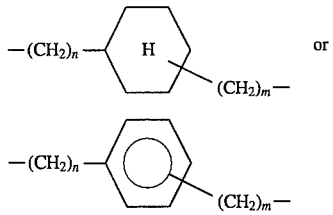

in which n is a number from 1 to 6 and indicates the number of methylene groups and m is a number from 0 to 6, wherein if said free valences of O are only partially saturated with O or by alkali metal ions then the remaining free valences of the oxygen atoms bonded to the silicon atom are saturated by silicon atoms of further groups of formula (II) and/or with the metal atoms of one or more of the crosslinking bridge members (III)

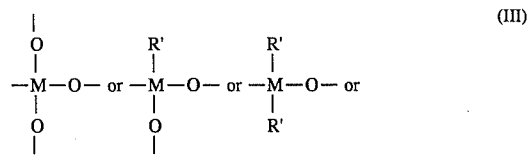

-continued

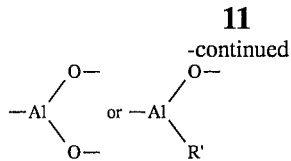 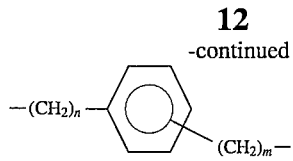

wherein M is a silicon, titanium or zirconium atom and R' is a linear or branched alkyl group with 1 to 5 C atoms and the ratio of the silicon atoms in the groups of formula (II) to the metal atoms in the bridge members (III) is 1:0 to 1:10, and in which $R^3$ is $R^1$ or $R^2$ or hydrogen, a linear or branched alkyl group of 1 to 20 C atoms, or a cycloalkyl group consisting of 5 to 8 C atoms, and $R^4$ represents hydrogen, a linear or branched alkyl group with 1 to 20 C atoms or a cycloalkyl group consisting of 5 to 8 C atoms, x is a number from to 3, X is an anion with the valency of x equal to 1 to 3 from the halide or sulphate group, by washing at least once with a 0.01 to 1 molar aqueous alkali hydroxide solution, washing said hydroxide until said hydroxide is neutral and free of $X^{x-}$ anions, and treating with a basic hydroxide in water at a temperature between 40° and 200° C., optionally at a pressure which corresponds to the sum of the partial pressures of the components in said method, until said organosiloxane-ammonium compounds have dissolved.

21. The aqueous alkaline solution according to claim 1 produced by a method comprising converting into a hydroxide formed or unformed polymeric, crosslinked organosiloxane-ammonium compounds with a silica skeleton, consisting of units with the formula

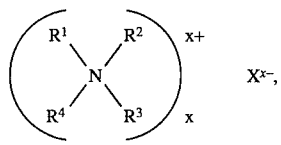

in which $R^1$ or $R^2$ are the same or different and signify a group with the formula

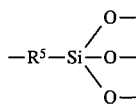

wherein the nitrogen atoms in (I) are connected via the residues R5 with the silicon atoms in (II) and $R^5$ represents an alkylene group with 1 to 10 C atoms, a cycloalkylene group with 5 to 8 C atoms or a unit with the formula

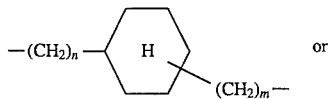

which n is a number from 1 to 6 and indicates the number of methylene groups and m is a number from 0 to 6, wherein if said free valences of O are only partially saturated with H or by alkali metal ions then the remaining free valences of the oxygen atoms bonded to the silicon atom are saturated by silicon atoms of further groups of formula (II) and/or with the metal atoms of one or more of the crosslinking bridge members (III)

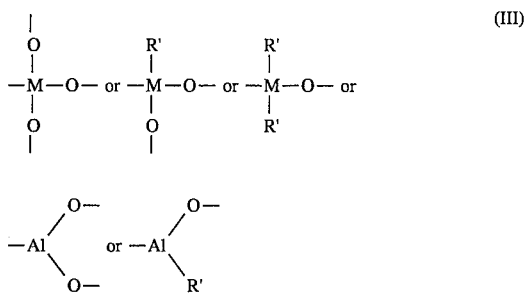

wherein M is a silicon, titanium or zirconium atom and R' is a linear or branched alkyl group with 1 to 5 C atoms and the ratio of the silicon atoms in the groups of formula (II) to the metal atoms in the bridge members (III) is 1:0 to 1:10, and in which $R^3$ is $R^1$ or $R^2$ or hydrogen, a linear or branched alkyl group of 1 to 20 C atoms, or a cycloalkyl group consisting of 5 to 8 C atoms, and $R^4$ represents hydrogen, a linear or branched alkyl group with 1 to 20 C atoms or a cycloalkyl group consisting of 5 to 8 C atoms, x is a number from 1 to 3, X is an anion with the valency of x equal to 1 to 3 from the halide or sulphate group, by washing at least once with a 0.01 to 1 molar aqueous alkali hydroxide solution, washing said hydroxide until said hydroxide is neutral and free of $X^{x-}$, and treating with a basic hydroxide in water at a temperature between 40° and 200° C., optionally at a pressure which corresponds to the sum of the partial pressures of the components in said method, until said organosiloxane-ammonium compounds used have dissolved.

* * * * *